(12) United States Patent
Larson

(10) Patent No.: US 6,590,439 B1
(45) Date of Patent: Jul. 8, 2003

(54) HIGH VOLTAGE INTEGRATED MILLER CAPACITOR FEEDBACK CIRCUIT

(75) Inventor: Bruce C. Larson, Saratoga, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/687,529

(22) Filed: Oct. 13, 2000

(51) Int. Cl.[7] .................................................. G06G 7/12
(52) U.S. Cl. ...................................... 327/363; 327/382
(58) Field of Search ................................ 327/362, 363, 327/382

(56) References Cited

U.S. PATENT DOCUMENTS 3,947,706 A * 3/1976 Holmes ...................... 327/538
5,287,404 A * 2/1994 Pepper et al. ................. 327/72
5,754,417 A * 5/1998 Nicollini ...................... 363/60
5,912,549 A * 6/1999 Farrington et al. ......... 323/207

OTHER PUBLICATIONS

Linear Technology Corporation, "LT1640L/LT1640H Data Sheet—Negative Voltage Hot Swap Controller," 1998.

* cited by examiner

Primary Examiner—Kenneth B. Wells
(74) Attorney, Agent, or Firm—Blakely, Sokoloff, Taylor & Zafman LLP

(57) ABSTRACT

A circuit for controlling an electronic semiconductor switching device to limit the in-rush current when an expansion board is plugged into an electronic system. An integrated thin-film capacitor is used in a high-voltage feedback circuit by attenuating the output voltage, which can be substantially greater than the breakdown voltage of the capacitor, with an integrated voltage divider. An adequate slew rate is obtained using a low capacitance by providing a high-impedance internal feedback node that is coupled to the gate of a power FET with a voltage buffer.

19 Claims, 3 Drawing Sheets

HIGH VOLTAGE INTEGRATED MILLER CAPACITOR FEEDBACK CIRCUIT

CROSS REFERENCE TO RELATED APPLICATIONS

Not applicable.

STATEMENT AS TO THE RIGHTS TO INVENTION MADE UNDER FEDERALLY SPONSORED RESEARCH AND DEVELOPMENT

Not applicable.

BACKGROUND OF THE INVENTION

The present invention relates generally to analog integrated circuits and more specifically to providing feedback from a high-voltage output to a control circuit.

In electronic systems, such as a telecommunications or computer system, it is often desirable to add or remove one or more electronic components from the system. For example, a user may desire to disconnect a printer or external disk drive from a computer system, or to add or remove a telephone expansion card from a telephone system. Many systems require or suggest that the system be turned off before adding, removing, or swapping components; however, this means that the system will have to re-start, typically consuming time that could otherwise be spent more productively.

It is generally more desirable to "hot swap" components, in other words, to change a component while the system is powered. Some components operate at relatively low voltage, i.e. less than about ±12 V, and have a sufficiently high input impedance on the power line to the component that there is relatively little draw on the system power supply when the component in plugged into the system. These components can usually be added or removed with the power on, as long as such handling does not damage the component.

Other components need additional circuitry to allow hot swapping. In particular, many electronic devices operate at relatively high voltages, i.e. about 36 to 100 V and −36 to −100 V, or power is distributed to components at a high voltage, and stepped down to the desired operating voltage. Hot swapping some of these devices can cause an in-rush of current that pulls the system power supply voltage down, adversely affecting and perhaps damaging other system components. The inrushing current can also damage the component that is being plugged in. Some devices use a relatively large bypass capacitor, typically hundreds of microfarads, between the high-voltage input and ground, which causes a large inrushing current when the component is plugged in and the capacitor is quickly charged to the supply voltage (according to $I=C^{dv}/_{dt}$). One way to limit the inrushing current and hence maintain acceptable system voltage levels is to control the rate at which the supply voltage changes on the swapped device.

A high-voltage field-effect transistor ("FET") is one type of device that can be used as a variable electronic switch to control the current delivered to the load, although other suitable devices are known in the art. A control signal (voltage) applied to the gate of the FET controls the current flowing between the drain and the source of the FET. In one type of control circuit, a capacitor connecting the output (drain) of the FET with the FET gate can limit the rate of change of voltage at the output of the FET by providing negative feedback. This type of feedback is often referred to as Miller feedback or Miller compensation, and the associated capacitor is known as a Miller capacitor. Although Miller feedback is often used in amplifier systems to move unwanted poles outside of the frequency operating range of the amplifier system, in this instance the Miller capacitor is used to control the slew rate of the output voltage from the power supply when a component is hot-swapped.

However, with high-voltage power supplies a high-voltage capacitor is needed in the feedback loop. Otherwise the capacitor would almost certainly fail due to dielectric breakdown. Thus, Miller capacitors used for controlling the slew rate of high-voltage output ports are external capacitors that are assembled onto a circuit board along with other control components, such as the gate current driver. It is generally desirable to limit the number of discrete, external components because they add component cost, assembly cost, and the connections (e.g. solder joints) provide additional potential failure points.

Therefore, it is desirable to provide a high-voltage output circuit with a controlled slew rate allowing hot-swapping of electronic components at the output port without using a high-voltage external capacitor.

SUMMARY OF THE INVENTION

An integrated Miller feedback circuit is used to control the in-rush current of an expansion board during hot-swapping and similar applications. The integrated circuit dispenses with the need for an external high-voltage, high-capacitance capacitor by attenuating a high-voltage output signal taken from the output node of an electronic semiconductor switching device. The attenuated feedback voltage is provided to one terminal of an integrated thin-film capacitor. The other terminal of the integrated thin-film capacitor is connected to a high-impedance internal feedback node. An integrated current source with a high output impedance provides or sinks current from the internal feedback node. An integrated voltage buffer amplifier between the internal feedback node and the control node of the electronic semiconductor switching device, e.g. the gate of a power FET, provides the control signal output.

DESCRIPTION OF THE PREFERRED EMBODIMENTS

The present invention provides an integrated control circuit for use with high-voltage power supplies. As used herein, a high voltage is less than about −30 Volts, or greater than about 30 Volts. An integrated circuit includes a resistor bridge and integrated low-voltage Miller capacitor in conjunction with a voltage driver suitable for controlling a high-voltage power FET or other electronic semiconductor switching device. The resistor bridge attenuates the voltage drop across the integrated thin-film capacitor, which draws current off of a high-impedance summing node supplied by a high-impedance current source. An integrated amplifier buffers the summing node voltage to provide the gate voltage signal to control the FET. Integration of the resistive voltage divider, integrated capacitor, high-impedance current source, and voltage buffer provide the same slew rate as a conventional Miller compensation circuit with a much smaller, low-voltage, integrated capacitor.

Figure 1:
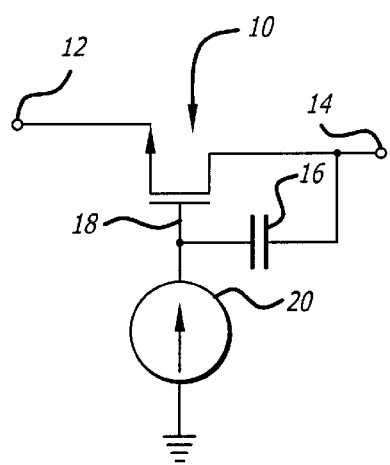
FIG. 1 is a simplified circuit diagram of a power output control circuit using a conventional external high-voltage capacitor.

FIG. 1 is a simplified circuit diagram of a power output control circuit using a conventional external high-voltage capacitor. A power FET 10, such as an IRF530™ sold by INTERNATIONAL RECTIFIER of El Segundo, Calif., is placed between the high-voltage power supply port 12 and the output 14 to the swappable device (not shown) and typically provides about 1–4 A to the output port, although higher current could be provided, depending on the system design.

A high-voltage extrinsic Miller capacitor 16 is connected between the gate 18 of the FET and the output 14. An on/off current source 20 provides current to drive the gate of the FET. In particular, the current supply is generally off until it is desired to control the electronic switching element, thus keeping the electronic switching element off.

The voltage at the power supply port is typically between about minus 100 to 100 Volts, as may be supplied by the backplane of a computer or other electronic system. Some power supplies might have a regulated range, such as between −36 to −76 Volts, while other supplies might drop below the high-voltage range. The output 14 typically provides a high-voltage output to a swappable device. The Miller capacitor must have a voltage rating sufficient to insure reliable operation at the maximum voltage possible on the output, for example a 100 V or higher rating. The capacitance is typically between about 1–100 nano-Farads, and a typical slew rate is about 10–12 V/mS.

The current source 20 typically provides about 20–60 micro-amps of current to directly drive the gate of the FET. The Miller capacitor essentially displaces some of this gate current when a corresponding change in voltage occurs across the capacitor. The relatively large value of the external Miller capacitor insures that the slew rate is determined primarily by the value of the capacitor, and not parasitic capacitances, such as parasitic gate capacitances.

Figure 2A:
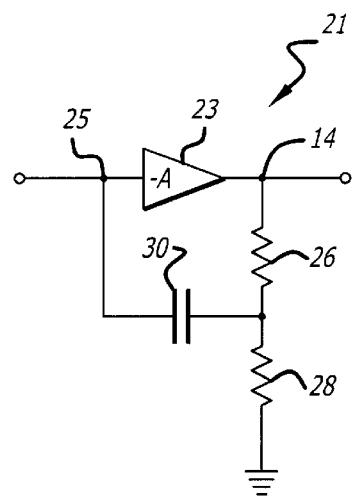
FIG. 2A is a simplified circuit diagram of an integrated Miller feedback control circuit according to an embodiment of the present invention.

FIG. 2A is simplified circuit diagram of an integrated Miller feedback control circuit 21 according to an embodiment of the present invention. An amplifier 23, such as an inverting operational amplifier, has a feedback node 25 integrated with a Miller capacitor 30. A two-resistor 26, 28 divider attenuates the voltage present at the high-voltage output 14 and provides the attenuated voltage across the integrated Miller capacitor to the feedback node. Integration of the Miller capacitor and feedback node allows the use of a capacitor with a relatively low breakdown voltage and a low (attenuated) feedback voltage.

Figure 2B:
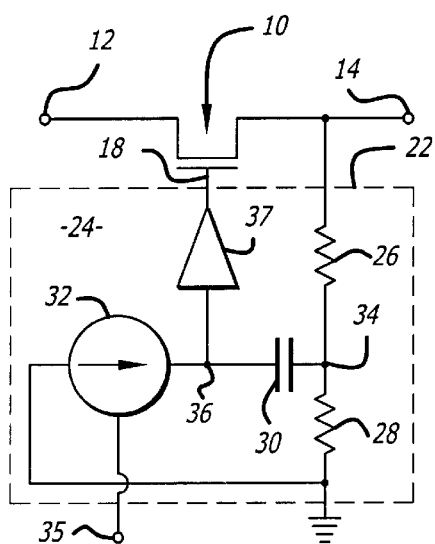
FIG. 2B is a simplified circuit diagram of a power output control circuit according to an embodiment of the present invention.

FIG. 2B is simplified circuit diagram of a power output control circuit according to an embodiment of the present invention. In this instance, an integrated Miller compensation circuit 22, represented by the dashed line, includes a resistive voltage divider 24 of two resistors 26, 28 that provides a feedback signal from the output 14 to gate 18 of the FET, such as an IRF530™, through an integrated Miller capacitor 30 and a voltage buffer amplifier 37. An n-channel FET is illustrated, and there are several suitable devices made by various manufactures; however, those skilled in the art will understand that a p-channel FET or other electronic semiconductor switching device, such as a bipolar transistor or a bipolar junction transistor could be used with suitable modification to the circuit. Similarly, an operational amplifier having a high-voltage output could be used in place of the FET. However, an electrically controlled mechanical relay is not suitable as an electronic switching device because it does not provide smoothly variable current control.

A current supply 32 provides the necessary current to an internal feedback node 36 depending on a control signal (ON/OFF) provided to a control port 35 of the circuit. The voltage buffer 37 between the internal feedback node and the gate provides a high-impedance at the internal feedback node while providing a low-impedance drive for the FET. In one embodiment, the current supply has an output impedance of about 1,000 Mohms, in another embodiment, the current supply has an output impedance of about 10,000 Mohms.

The current supply, voltage buffer, integrated Miller capacitor, and resistors are all fabricated on a single chip using a process sequence, such as a complementary metal-oxide-semiconductor ("CMOS") process, although other processes, such as a bipolar process or combinations of various fabrication processes could be used.

The chip on which the integrated Miller compensation circuit is fabricated could include additional circuits providing additional functionality, implemented in CMOS or other fabrication processes. For example, in further embodiments, the semiconductor chip could include a voltage regulator to convert the high voltage provided at the source of the FET ($V_{EE}$) to a circuit bias voltage, e.g. a voltage of about −9 V to power controller logic functions. Alternatively, the bias voltage might be supplied at the backplane. Similarly, a lockout circuit might turn off the FET if $V_{EE}$ drops below a pre-selected limit, such as −30 V, −20 V, or −9 V; or a direct ON/OFF control may be available. Additionally, a circuit might be added that determines if the output voltage is within the desired range, and generates a signal indicating if the power is good or not. The chip could be a silicon chip, a semiconductor-on-insulator, or other type of chip generally used for the implementation of integrated circuits.

In one embodiment, the current source is kept off for a preselected delay period after $V_{EE}$ is supplied, providing a period of time to insure that the integrated Miller compensation circuit will control the output. The time can be controlled digitally in conjunction with a timer, or with an RC circuit, for example. In a particular embodiment, the circuit has a start-up delay of about 150 mS between application of $V_{EE}$ and power at the output. In a further embodiment, this start-up delay can be disabled for testing purposes. A similar delay of the same or a different duration, such as about 10 mS, could be added when the FET is shut down.

Additional logic can be defined on the circuit to shut down the device (i.e. turn off the FET) when the input has fallen below a predetermined limit for a selected period of time, or when the input suddenly rises, or when the difference between $V_{DRAIN}$ and $V_{SOURCE}$ exceed a pre-selected limit. The circuit could then, after a selected period of time, turn the FET back on, operating essentially as a circuit breaker with an automatic re-try. Alternatively, the device may be latched off until a re-set signal is provided.

A thermal shut-down unit can also be included. In one embodiment, the thermal sensor is physically located near the output pin of the packaged integrated circuit that connects to the drain of the FET. This structure provides good thermal coupling between the thermal sensor and the FET. The power dissipation of the integrated Miller compensation circuit is relatively low, generally within about 15 degrees of ambient, thus the temperature of the FET will dominate the junction temperature of the integrated circuit. When the junction temperature exceeds about 150° C., the circuit will shut down, and re-start when the temperature has dropped about 10–20° C. below the shutdown temperature.

It is understood that terms such as "rise" or "in" and "out" are used for convenience of illustration, and that actual values of voltages and currents, for example, may trend in opposite directions according to sign conventions. In particular, if the output voltage is a negative voltage, it is the absolute value of the voltage that would rise while the true value of the voltage referenced to a common potential would be falling, or the current source may be drawing current off of the internal feedback node, rather than providing current.

The integrated Miller capacitor is a thin-film capacitor having a dielectric layer of silicon oxide, silicon nitride, silicon oxy-nitride or similar or combinations of dielectric layers. It is generally desirable to conserve surface area on a chip to increase the yield of chips per wafer; thus it is desirable to make the integrated Miller capacitor as small as possible. However, generally speaking, a capacitor having a smaller area has a lower capacitance, and thus would be less effective as a Miller compensation element. Similarly, because the capacitor might be subjected to voltages of at least about 9 V across the capacitor, the dielectric layer must be made sufficiently thick to insure that the field gradient across the dielectric layer does not exceed the recommended maximum. However, making a thicker dielectric layer also generally reduces the capacitance of the capacitor. Also, it would be desirable to use a standard dielectric layer formation step during the processing of the integrated circuit, and not have to deposit a special layer just for this one circuit element. Thus, there are several issues relating to the integration of Miller compensation.

The present invention overcomes these problems by providing a voltage divider to attenuate the voltage present at the capacitor. At first glance, it might appear that the integrated Miller capacitor would have to have higher capacitance than an equivalent high-voltage Miller capacitor, as discussed above in reference to FIG. 1, in order to maintain the same output slew rate characteristics (e.g. 10–12 V/ms). For example, if the high-voltage output 14 is a −100 V output and the voltage divider 24 is a 10:1 divider, then a voltage change of only about 10 volts is present at the center node 34 of the voltage divider to be coupled to the internal feedback node 36, assuming a voltage change on the output of 100 V.

However, the integrated Miller feedback can achieve the same slew rate (e.g. 10–12 V/mS) with a much lower capacitance value, typically between about 10–100 pico-Farads. In a particular embodiment the capacitor is about 17 pico-Farads. This reduction in capacitance can be achieved by decreasing the amount of current from the current source 32 and providing a buffer amplifier 37 between the internal feedback node and the gate of the FET. In other words, the smaller integrated Miller capacitor can achieve the same slew rate with an increase in the internal feedback node impedance and voltage buffering between the internal feedback node and the gate of the FET.

Thus, the integrated current source 32 provides only a slight amount of current, generally under 100 nA and perhaps as low as 10–20 nA, which is compensated by the small amount of current displaced by the integrated Miller capacitor. The buffer amplifier 37 provides the current to drive the FET 10, thus insuring that the slew rate is controlled by the Miller capacitor, rather than the parasitic gate capacitances of the FET. As the voltage on the output node 14 changes, the integrated Miller capacitor essentially diverts current from the internal feedback node 36 such that a fairly constant voltage is maintained at the feedback node 36, and thus at the gate 18 of the FET. This regulates the current provided at the output 14 by maintaining a fairly constant $V_{GS}$.

The current source 32, center node 34, integrated Miller capacitor 30, internal feedback node 36, and buffer amplifier are all internal to the integrated circuit 22. Thus, it is possible to use a high-impedance internal feedback node with very little control current from the current source 32. In particular, providing a control current of only 10–20 nA with a conventional external Miller capacitor would be difficult because stray leakage currents and even noise currents could disrupt the control loop. The higher control currents utilized with conventional external Miller capacitors, which might be about 45 micro-amps, are not significantly affected by these extraneous currents.

Figure 2C:
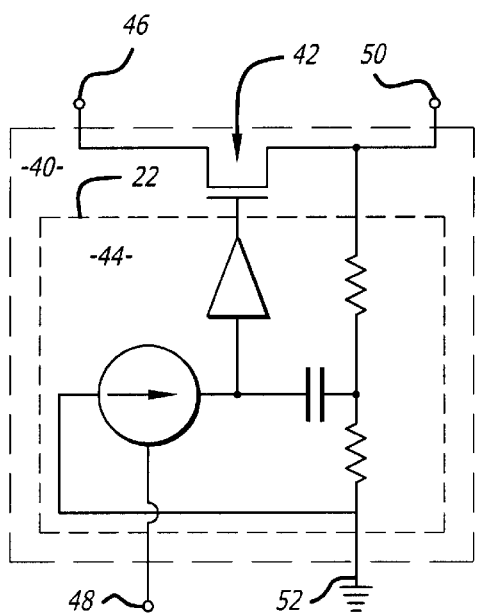
FIG. 2C is a simplified diagram of a power output control circuit with an integrated electronic semiconductor switching device according to another embodiment of the present invention.

FIG. 2C is a simplified circuit diagram of a power output control circuit 40, represented by the dashed line, with an integrated electronic switching device 42 according to another embodiment of the present invention. In this instance, the high-voltage FET or other electronic semiconductor switching device 42 is integrated with the Miller compensation circuit 44, represented by the dotted line. The device could be integrated on a single chip, or could be a hybrid integrated circuit, with electrical connections between the FET and the Miller compensation circuit being made through wire bonds, metallic lines or traces on a circuit substrate, or similar techniques. The power output control circuit 40 has a high-voltage input port or node 46, an ON/OFF control port 48, and a controlled high-voltage output 50, and a ground or common port 52.

Figure 2D:
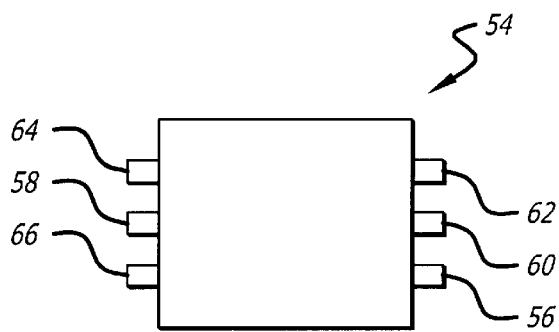
FIG. 2D is a simplified top view of a packaged integrated Miller compensation circuit according to an embodiment of the present invention.

FIG. 2D is a simplified top view of a packaged integrated Miller compensation circuit 54 for controlling an electronic switching device according to an embodiment of the present invention. The package includes a power supply voltage input pin 56 that in one embodiment is electrically coupled to $V_{EE}$ and regulated in the device to obtain other desired voltages, a ground or common pin 58, a feedback input pin 60 that is electronically coupled to the output of the electronic semiconductor switching device being controlled, a switch control pin 62, which is electronically coupled to the gate of a power FET, for example, and an ON/OFF pin 64 that enables the circuit and allows the electronic switching device to be turned on. In some embodiments the ON/OFF pin is omitted and a suitable delay circuit is included in the packaged device. In a further embodiment, a power good ("PGOOD") pin 66 provides an electronic signal indicating that the circuit is functioning to control the output voltage.

Figure 3:
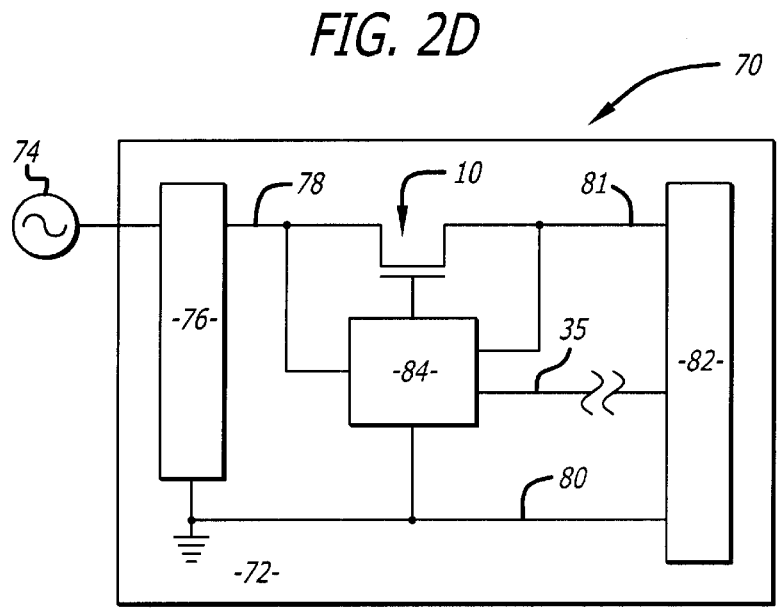
FIG. 3 is a simplified diagram of a power supply card according to an embodiment of the present invention.

FIG. 3 is a simplified diagram of a power supply card 70 according to an embodiment of the present invention. The power supply card includes a printed-wiring board substrate 72 and receives electrical power from a line source 74, such as a wall outlet. A voltage regulator 76 generally includes transformers, AC-DC converters, and voltage regulation circuitry to provide a high-voltage line 78 and a ground return line 80. It is also understood that the power supply card may have additional components and signals that are not shown for clarity of illustration.

The high-voltage line 78 is connected to the FET 10 or similar electronic switching device that provides a high-voltage output 81 with controlled slew rate to the connector 82, such as a socket connector, an edge connector, or a plug connector. An integrated Miller compensation circuit 84 operates substantially as described in reference to FIG. 2B, above, to limit the rate of change of voltage at the output 81. The integrated Miller compensation circuit is typically a single silicon chip with the necessary circuitry, including the current source, integrated Miller capacitor, and voltage divider fabricated thereon.

An ON/OFF control 35 to turn the current source on and off is also provided. As shown above in FIG. 2D, the packaged device may include an ON/OFF pin (ref. num. 64), or a timer or delay circuit can provide the ON/OFF control function. Generally speaking, it is desirable to have the control circuit in an off state when or as the expansion board or similar device is connected to the main (backplane) power supply. In one embodiment, a jumper wire turns on the control circuit by shorting together two pins on the connector 82 to turn on the control circuit when a board is plugged into the connector, and turning the control circuit off when the board is unplugged. In another embodiment, the ON/OFF control is provided by a system input, in which case the control line would not have to go to the connector 82. Alternatively, the control circuit can be included on an expansion board or similar device, rather than the motherboard power supply.

Figure 4:
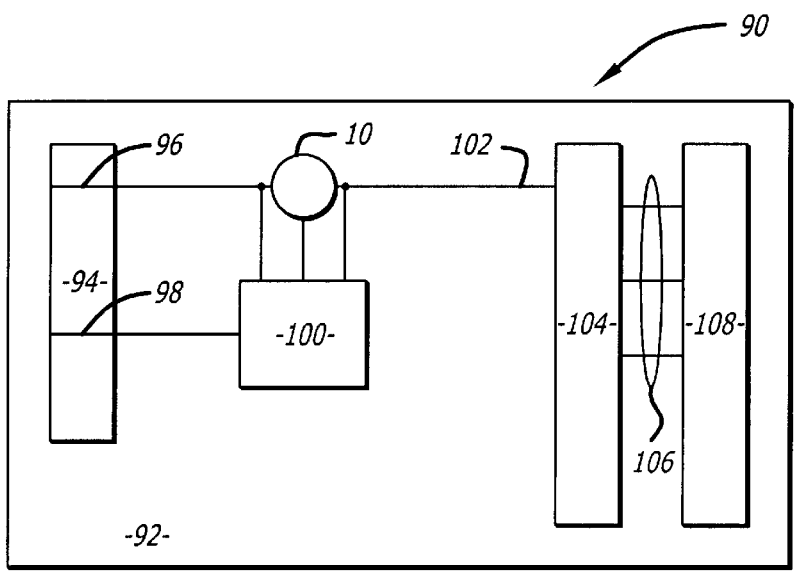
FIG. 4 is a simplified diagram of an expansion card according to an embodiment of the present invention.

FIG. 4 is a simplified diagram of an expansion card 90 according to another embodiment of the present invention. The expansion card is intended to be installed into a computer, telecommunication system, or other electronic system to provide additional functionality. For example, the expansion card might provide power and control circuitry for a network card, a telephone, a modem, or an additional disk drive. The expansion card typically receives power from the system when it is plugged into or otherwise electrically connected to the system, but some expansion cards might have additional power sources, such as from an additional line transformer.

The expansion card is typically built on a printed wiring substrate 92 and has a connector 94 for electrically coupling the expansion card to the computer or other electronic system. The connector can be an edge connector, zero-insertion force connector, socket connector, or plug connector, among others. The connector has a high-voltage pin 96 and a control signal pin 98, and typically has additional pins (not shown). The term "pin" as used herein is intended to mean any of various sorts of connector hardware, such as sockets, blades, spring-wipers, among others, and not just pins. The high-voltage pin is connected to a high-voltage switching device 10 (such as an FET), while the control signal pin is connected to a current source in an integrated Miller compensation device 100 and turns the current source on and off.

The integrated Miller compensation device is connected to the high-voltage output 102 of the FET, which in this case is provided to an optional on-board voltage regulator 104. The voltage regulator converts the high voltage from the FET to various voltages, which are supplied to a load 108 over a number of electrical conductors 106. The electrical conductors are exemplary only. The load might encompass a wide range of electrical components, such as motors, controllers, memory components, and/or amplifiers, for example, which might reside on the expansion card or be electrically coupled to the expansion card.

Figure 5:
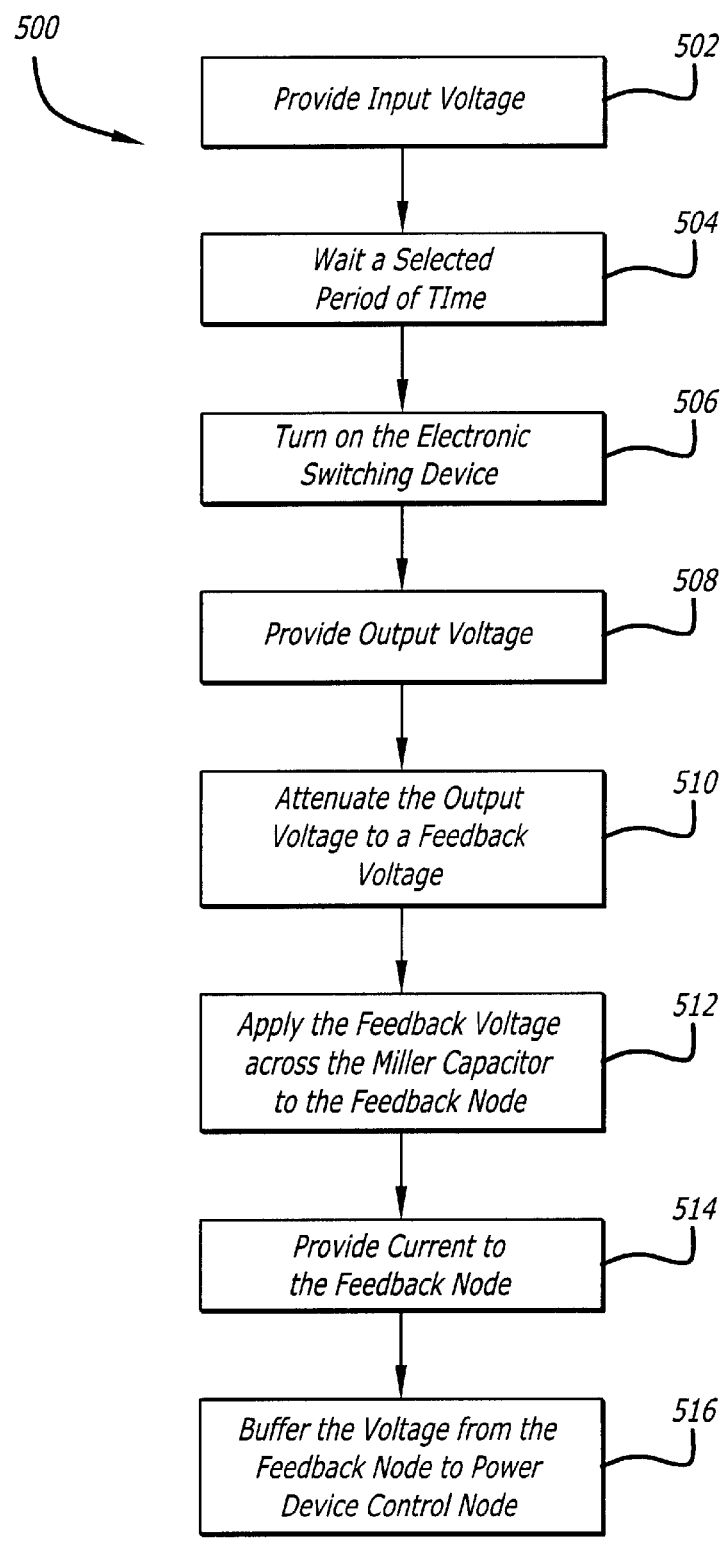
FIG. 5 is a simplified flow chart for a method of controlling the slew rate of a high-voltage output port according to another embodiment of the present invention.

FIG. 5 is a simplified flow chart of a process 500 for avoiding an inrush current surge on an expansion board. An output voltage is provided to an output node (step 508) and attenuated to a feedback voltage (step 510). The feedback voltage is applied across a Miller capacitor to an internal feedback node (step 512). A current source provides (or extracts) current from the internal feedback node (step 514). The internal feedback node voltage is buffered (step 516) and provided to a control node that is typically connected to the gate of a FET. Those skilled in the art will appreciate that the order of steps given is exemplary, and that many of the steps occur essentially simultaneously.

A change in the output voltage will be coupled to the internal feedback node through the voltage divider and the capacitor, and this change in voltage will displace current (charge) from the internal feedback node, thus providing negative feedback to the gate of the power FET. In a further embodiment, an input voltage is provided to the input of an electronic semiconductor switching device (step 502) and the electronic semiconductor switching device is partially turned on (step 506) to provide an output voltage at the output of the electronic switching device. In yet a further embodiment, there is a waiting period (step 504) between applying the input voltage and turning on the electronic switching device.

Although the present invention has been described with reference to specific embodiments, modification and variation can be made without departing from the subject of the invention as defined in the following claims. For example, different slew rates might be desired and different capacitance values used. Similarly, different dielectric materials, such as metal oxides or organic polymer material, might be used in the integrated Miller capacitor. Other substitutions and equivalents may become apparent to those skilled in the art. Therefore, the invention is not limited by the above examples, but is to be determined in light of the following claims.

I claim:

1. An expansion card comprising:
   a printed wiring substrate including a connector to receive an input voltage and control circuits; and
   an integrated Miller compensation circuit to generate a first voltage for said control circuits whose slew rate is lower than the slew rate of said input voltage, said compensation circuit comprising:
      an output voltage node which rises to said first voltage;
      an integrated voltage divider configured to attenuate the first voltage to provide a second voltage at a first internal node;
      an integrated thin-film capacitor electronically coupled between the first internal node and
      an internal feedback node.

2. The expansion card of claim 1 wherein the internal feedback node is coupled to an inverting input of an amplifier.

3. The expansion card of claim 1 further comprising
   a current source configured to provide a current to the internal feedback node; and
   a voltage buffer amplifier having an input coupled to the internal feedback node.

4. An expansion card comprising:

a printed wiring substrate including a connector to receive an input voltage and control circuits; and an integrated Miller compensation circuit to generate a first voltage for said control circuits whose slew rate is lower than the slew rate of said input voltage, said compensation circuit comprising:

an output voltage node which rises to said first voltage;

an integrated voltage divider configured to attenuate the first voltage to provide a second voltage at a first internal node;

an integrated thin-film capacitor electronically coupled between the first internal node and an internal feedback node;

an integrated current source configured to provide current to the internal feedback node; and an integrated voltage buffer amplifier having a buffer input electronically coupled to the internal feedback node and a buffer output electronically coupled to an electronic semiconductor switch control node.

5. The expansion card of claim 4 wherein the first voltage has an absolute voltage of more than about 30 Volts and the integrated thin-film capacitor has a breakdown voltage less than about 30 Volts, and the second voltage is less than the breakdown voltage.

6. The expansion card of claim 4 wherein the integrated current source has an output of less than about 100 nanoamps.

7. The expansion card of claim 4 wherein the internal feedback node has an impedance greater than about 1,000 Megohms.

8. The expansion of claim 4 wherein the integrated thin-fihn capacitor has a capacitance less than about 50 picofarads.

9. The integrated Miller compensation circuit of claim 4 wherein the integrated current source is switched on and off in response to a first control signal and a second control signal.

10. The expansion card of claim 4 wherein the first voltage has an absolute voltage between about 30–100 Volts.

11. An expansion card comprising:

a printed wiring substrate including a connector to receive an input voltage and control circuits; and an integrated Miller compensation circuit to generate a first voltage for said control circuits whose slew rate is lower than the slew rate of said input voltage, said compensation circuit comprising:

an output voltage node which rises to said first voltage having an absolute value of between about 30–100 Volts;

an integrated voltage divider configured to attenuate the first voltage to provide a second voltage at a first internal node;

an integrated thin-film capacitor having a breakdown voltage less than the first voltage and greater than the second voltage and a capacitance less than about 50 picofarads, and electronically coupled between the first internal node and an internal feedback node having a feedback node impedance greater than about 1000 Mohms;

an integrated current source configured to provide current to the internal feedback node; and an integrated voltage buffer amplifier having a buffer input electronically coupled to the internal feedback node and a buffer output electronically coupled to an electronic semiconductor switch control node.

12. An expansion card comprising:

a printed wiring substrate including a connector to receive an input voltage and control circuits; and an electronic circuit to generate a first voltage for said control circuits whose slew rate is lower than the slew rate of said input voltage, said compensation circuit comprising:

an electronic semiconductor switching device having an input port, a control port, and an output port;

a voltage divider configured to attenuate said first voltage at the output port to a second voltage at a first internal node;

a thin-film capacitor electronically coupled between the first internal node and an internal feedback node;

a current source configured to provide current to the internal feedback node; and a voltage buffer amplifier having a buffer input electronically coupled to the internal feedback node and a buffer output electronically coupled to the control port, wherein at least the thin-film capacitor, the internal feedback node, the current source, and the voltage buffer amplifier are integrated on a semiconductor chip.

13. The expansion card of claim 12 wherein the electronic semiconductor switching device is integrated on the semiconductor chip.

14. The expansion card of claim 12 wherein the voltage divider is integrated on the semiconductor chip.

15. The expansion card of claim 12 wherein the electronic semiconductor switching device is a field-effect transistor.

16. A method for operating a Miller feedback circuit, the method comprising:

connecting an expansion card into a computer bus to receive an input voltage;

providing an output voltage to an output node from said input voltage;

attenuating the output voltage to a feedback voltage;

applying the feedback voltage across a capacitor to an internal feedback node, wherein an input of an integrated operational amplifier is coupled to the internal feedback node.

17. A method for operating a Miller feedback circuit, the method comprising:

connecting an expansion card into a computer bus to receive an input voltage;

providing an output voltage to an output node from said input voltage;

attenuating the voltage to a feedback voltage;

applying the feedback voltage across a capacitor to an internal feedback node;

providing a first current to the internal feedback node from a current source; and buffering the voltage at the internal feedback node to provide a second voltage at a control node.

18. The method of claim 17 further comprising steps, prior to the providing a voltage step, of providing said input voltage to an input node of an electronic semiconductor switching device; and turning the electronic semiconductor switching device at least partially on.

19. The method of claim 17 further comprising a step, between the providing an input voltage step and the turning the electronic semiconductor switching device at least partially on step, of waiting a selected period of time.

* * * * *